(12) United States Patent
Beall

(10) Patent No.: US 7,867,932 B2
(45) Date of Patent: Jan. 11, 2011

(54) REFRACTORY GLASS CERAMICS

(75) Inventor: George H. Beall, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 363 days.

(21) Appl. No.: 11/895,847

(22) Filed: Aug. 28, 2007

(65) Prior Publication Data

US 2009/0056380 A1 Mar. 5, 2009

(51) Int. Cl.
    *C03C 10/06* (2006.01)
(52) U.S. Cl. .......................................................... 501/8
(58) Field of Classification Search .................. 501/8
    See application file for complete search history.

(56) References Cited

U.S. PATENT DOCUMENTS

| | | | | |
|---|---|---|---|---|
| 2,920,971 A | * | 1/1960 | Stookey | 501/2 |
| 3,531,303 A | | 9/1970 | Bhat et al. | 106/39 |
| 3,586,522 A | | 6/1971 | Hoffman et al. | 106/39 |
| 3,720,526 A | | 3/1973 | Duke et al. | 106/39.6 |
| 3,756,798 A | | 9/1973 | Ernsberger et al. | 65/33 |
| 3,756,838 A | | 9/1973 | Beall | 106/39.6 |
| 3,837,978 A | | 9/1974 | Busdiecker et al. | 161/1 |
| 3,953,220 A | | 4/1976 | Miller | 106/39.8 |
| 3,955,990 A | | 5/1976 | Tochon | 106/39.6 |
| 3,985,532 A | * | 10/1976 | Grossman | 65/33.3 |
| 4,004,052 A | | 1/1977 | Bystrova et al. | 427/374 |
| 4,028,121 A | | 6/1977 | Chyung | 106/39.8 |
| 4,112,135 A | | 9/1978 | Heaps et al. | 427/11 |
| 4,128,680 A | | 12/1978 | Heaps et al. | 428/137 |
| 4,135,936 A | | 1/1979 | Ballard, Jr. | 106/39.6 |
| 4,137,355 A | | 1/1979 | Heaps et al. | 428/201 |
| 4,304,603 A | * | 12/1981 | Grossman et al. | 501/9 |
| 4,360,567 A | | 11/1982 | Guillevic | 428/410 |
| 4,390,634 A | | 6/1983 | Hoda | 501/3 |
| 4,464,475 A | * | 8/1984 | Beall et al. | 501/9 |
| 4,615,987 A | | 10/1986 | Chyung et al. | 501/8 |
| 4,687,749 A | | 8/1987 | Beall | 501/5 |
| 4,897,509 A | * | 1/1990 | Holleran et al. | 174/258 |
| 4,935,387 A | | 6/1990 | Beall et al. | 501/3 |
| 4,973,564 A | | 11/1990 | Chyung et al. | 501/32 |
| 5,023,207 A | | 6/1991 | MacDowell | 501/8 |
| 5,070,045 A | | 12/1991 | Comte et al. | 501/4 |
| 5,695,725 A | | 12/1997 | Talmy et al. | 423/133 |
| 5,747,396 A | | 5/1998 | Hiroaki et al. | 501/32 |
| 5,786,286 A | * | 7/1998 | Kohli | 501/8 |
| 5,910,459 A | | 6/1999 | Beall et al. | 501/8 |
| 6,300,263 B1 | | 10/2001 | Merkel | 501/9 |
| 6,620,751 B1 | | 9/2003 | Ogunwumi | 501/134 |
| 6,699,605 B2 | | 3/2004 | Umayahara et al. | 428/701 |
| 7,285,507 B2 | * | 10/2007 | Fukuta et al. | 501/8 |
| 2002/0023463 A1 | | 2/2002 | Siebers et al. | 65/99.5 |
| 2003/0129414 A1 | | 7/2003 | Ota et al. | 428/426 |
| 2006/0022385 A1 | | 2/2006 | Rosenflanz | 264/600 |
| 2006/0100087 A1 | | 5/2006 | Fukuta et al. | 501/125 |

FOREIGN PATENT DOCUMENTS

| | | |
|---|---|---|
| GB | 924996 | 9/1959 |
| GB | 970463 | 5/1963 |
| GB | 988319 | 10/1963 |
| GB | 1 124 020 | 8/1965 |
| GB | 1 605 375 | 6/1994 |
| WO | WO 97/30001 | 8/1997 |

OTHER PUBLICATIONS

G.H. Beall, "Refractory Glass-Ceramics", High Temperature Oxides, Part IV Refractory Glasses, Glass-Ceramics, and Ceramics, Academic Press, Chapter 2, pp. 15-36.

* cited by examiner

*Primary Examiner*—Karl E Group
(74) *Attorney, Agent, or Firm*—Thomas R. Beall

(57) ABSTRACT

A formation of internally nucleated glass ceramics articles that can be heated in the 1350-1450° C. range for extended periods of time without significant deformation or change in shape is disclosed. The predominant crystal phase of these glass ceramics is celsian ($BaAl_2Si_2O_8$) or its strontium equivalent ($SrAl_2Si_2O_8$), or solid solutions or mixtures of these compositions, all belonging to the feldspar mineral group.

21 Claims, No Drawings

REFRACTORY GLASS CERAMICS

TECHNICAL FIELD

The present invention relates to the formation of internally nucleated glass ceramics articles that can be heated in the 1350-1450° C. range for extended periods of time without significant deformation or change in shape. The predominant crystal phase of these glass ceramics is celsian ($BaAl_2Si_2O_8$) or its strontium equivalent ($SrAl_2Si_2O_8$), or solid solutions or mixtures of these compositions, all belonging to the feldspar mineral group.

BACKGROUND

Glass-ceramic articles are produced through the controlled crystallization of glass articles. In general, a glassforming batch, to which a nucleating agent is commonly added, is melted and this melt cooled to a uniform glass body.

The glass body is then subjected to a heat treatment schedule which usually comprises two phases. First, the glass is heated somewhat above the transformation range of the glass to cause the development of nuclei therein. Thereafter, the nucleated glass is heated to a higher temperature, normally above the softening point of the glass, to cause the growth of crystals on the nuclei. Since the crystallization occurs on the innumerable nuclei developed during the nucleation step, the crystals are uniformly fine-grained and homogeneously dispersed in a glassy matrix.

The crystals generally comprise the preponderance of the article and, therefore, endow the article with properties more similar to those of the crystal phase than those of the original glass. However, since the body is crystallized in situ from a glass, it is free of voids and non-porous.

Silicon semiconductors are more efficient in display or photovoltaic devices if the grains are large. Silicon melts at 1417° C., and it can be subsequently crystallized to the largest grains when held just below its melting point. This is because nucleation is inefficient at such high temperatures but grain growth is maximized. Since the growth of these crystallized films initially requires application of a film of molten silicon to a substrate surface, it is important that the substrate material itself be inert, able to withstand high temperature, and have a coefficient of expansion (CTE) that approximately matches that of silicon. If silicon is melted on an inert substrate and subsequently recrystallized near its melting point, it will remain as a coherent large-grained film upon cooling to room temperature providing the substrate approximately matches the silicon in CTE. The glass-ceramics of this invention can be tailored to match or be very close to the CTE of silicon. Moreover, certain suboxide semiconductors that also display photovoltaic behavior, e.g. reduced titanates and certain tantalates, require high temperatures (above 1300° C.) to be effectively sintered. Therefore, films of these materials require a substrate which can withstand sintering temperatures above 1400° C. Further, there is also a need for ceramic materials which can replace superalloy metals in certain engine components such as those used in aircraft engines and in diesel turbochargers. Silicon nitride is such a candidate, but it is difficult to fabricate and inherently expensive. Accordingly, there is a need for a high temperature glass ceramic material that can be utilized as an inert substrate for thin film crystal silicon production, can be tailored to match the CTE of silicon, can withstand temperatures of as high as 1450° C., is resistant to oxidation, and is capable of being precision formed in the fluid glassy state by pressing techniques or by simple casting into graphite or other molds.

SUMMARY

The present invention provides a glass-ceramic having high fracture toughness and low coefficient of thermal expansion, the glass-ceramic formed from a composition comprising, in weight percent:

| | |
|---|---|
| $SiO_2$ | 25-45% |
| $Al_2O_3$ | 23-37% |
| $TiO_2$ | 5-15% |
| BaO | 0-35% |
| SrO | 0-30% |
| $SrO + BaO/Al_2O_3$ | <1.2 |

The glass-ceramic includes feldspar as a primary crystalline phase. The major phase is celsian ($BaAl_2Si_2O_8$) or its strontium equivalent ($SrAl_2Si_2O_8$) or solid solutions or mixtures of celsian ($BaAl_2Si_2O_8$) and its strontium equivalent ($SrAl_2Si_2O_8$). There may be secondary crystal phases including aluminum titanate, mullite, anatase and rutile. For most applications, the glass ceramic has less than 25% by volume of residual glass.

For certain applications, it is preferred that the glass-ceramic be alkali-free and substantially free of additional fluxes. In other embodiments, fluxes or additional components may be added, but typically not in excess of 5% by weight.

In one embodiment, the glass ceramic has a CTE from $30\text{-}55\times10^{-7}/°$ C. in the temperature range 25-1000° C., has a softening temperature in excess of 1450° C., a fracture toughness exceeding $1.2\ K_{1c}\ MPa\cdot m^{1/2}$, a modulus of rupture (M.O.R.) exceeding 90 MPa, and use temperature in excess of 1250° C., and as high as 1450° C., or higher.

Several uses of the glass ceramics of the present invention have been identified including high temperature refractory uses such as those required in substrates for photovoltaic devices, metallurgical casting molds, radomes and engine components.

Further disclosed are methods of producing glass ceramic articles that do not deform or change in shape when heated within the range of 1250° C.-1450° C. One embodiment comprises the steps of melting a batch of raw materials including at least one nucleating agent to a temperature of 1550° C. to 1700° C. for a period of time sufficient to achieve a molten homogeneous melt; forming into a desired shape, a glass article from the melt; annealing the glass article at a temperature in the range of 700° C. to 850° C.; heat treating the glass article at a temperature of 800° C. to 900° C. for a period of time sufficient for homogeneous dispersion and development of nuclei from the nucleating agent; crystallizing the glass at a temperature in the range of 950° C. to 1450° C. for a time sufficient to achieve maximum crystallinity thereby transforming the glass article into a glass ceramic article; and cooling the glass ceramic article.

DETAILED DESCRIPTION

An internally nucleated glass ceramic that can be heated in the 1250-1450° C. range for extended periods of time without significant deformation or shape and whose predominant crystal phase of either the feldspar celsian ($BaAl_2Si_2O_8$) or its strontium equivalent ($SrAl_2Si_2O_8$), or solid solutions or mixtures of these compositions, is disclosed. A glass-ceramic includes any material that is formed when a substantially glassy material is heated at elevated temperature to produce a substantially crystalline material. The heat treatment induces nucleation of one or more crystalline phases. Nucleation is accelerated by adding a component to the glass such as titania ($TiO_2$) which precipitates uniformly upon reheating the glass. The heat treatment is completed when the intended level of crystallinity is reached. For most glass ceramics, this occurs when crystallinity is in excess of fifty percent and more typically in excess of eighty percent by weight.

These glass ceramic materials are characterized by excellent refractory characteristics and are made from glasses that can be melted to good quality at temperatures in the 1600-1675° C. range, a range within which the effective melting of other commercial glasses or glass-ceramic parent glasses has been established.

The glass-ceramic of the present invention may include a plurality of crystalline phases, but is comprised of a predominant primary crystalline phase of feldspar. For many applications, the residual glass should be stiff enough so as not to cause a composite article that has been formed from the material to deform or change shape at temperatures in excess of 1250° C., in excess of 1300° C., in excess of 1350° C., and in excess of 1400° C. In other words, the embodiments of the glass ceramic articles of the present invention have use temperatures of greater than 1250° C. and as high as 1450° C. The term "use temperature" indicates that an article formed from the glass ceramic will not deform when put under load or under its own weight. To this end, crystallinity should be at least about 70% of the weight and preferably more than 80% crystalline. Residual glass will typically be less than 25% by volume.

Celsian is a barium feldspar, has a monoclinic structure, with crystallographic space group I2/c, and its strontium equivalent has a similar monoclinic structure believed to be of the same space group. Solid solution between these end-members is believed wide but may not be complete. The value of these celsian-type crystals as the major phase in glass-ceramics is at least two-fold: i) the high melting point, roughly 1750° C. for the pure barium end-member, and roughly 1710° C. for the strontium end member, which combined with the effects of a titanate nucleating agent and residual glass present in the glass-ceramics, allows thermal stability to about 1450° C., and ii) their relatively low CTE, in the $40\text{-}55 \times 10^{-7}/°$ C. range from 25-1000° C. In combination with a significant amount of siliceous residual glass, the CTE values of the actual glass-ceramics can be lowered into the $30\text{-}45 \times 10^{-7}/°$ C. (25-1000° C.) range, an excellent substrate match to silicon, and a low enough value to provide good thermal shock resistance for use as engine components, radomes and metallurgical casting molds. Accordingly, the disclosed glass ceramics may have a CTE ranging from approximately $30\text{-}55 \times 10^{-7}/°$ C. (25-1000° C.). Specific examples listed in Table 1 demonstrate a CTE range of between $36.9\text{-}43.7 \times 10^{-7}/°$ C. (25-1000° C.). By varying the percentage of siliceous glass within the composite, one can vary the CTE within the broader disclosed range. However and for certain applications where stiffness is required, the variation of siliceous glass should remain within the limits required to prevent significant deformation of the article upon heat treatment to approximately the 1400° C. point.

Although the use of $TiO_2$ as a nucleating agent has been effectively demonstrated, other potential candidates for use as nucleating agents include: $ZrO_2$; metals such as platinum, rhodium, iridium, lead or gold; or sulphides such as ZnS. Other candidates include: $V_2O_5$, $MoO_3$, $SrF_2$, $BaF_2$, $WO_3$, and NiO.

The glass-ceramic composition range of an embodiment of this invention lies in the $SiO_2$—$Al_2O_3$—SrO—BaO—$TiO_2$ system and comprises the following area in weight percent: $SiO_2$ 25-45, $Al_2O_3$ 23-37, SrO 0-30, BaO 0-35, and $TiO_2$ 5-15. The sum of SrO+BaO is between 15 and 35 weight percent and the molar ratio of (SrO+BaO)/$Al_2O_3$ is preferably less than 1.2, more preferably less than 1.1 and still more preferably less than 1.0. Up to 5% by weight of additional components (e.g. $ZrO_2$, $K_2O$, ZnO, CaO, etc.) may be added to modify certain physical characteristics (e.g. CTE, stability, etc.) of the final composite. However, it should be noted that the addition of additional components typically lowers the melting point of the final composition and thereby may affect the attractiveness of such materials for certain refractory applications. For electronic applications involving contact with silicon at temperatures in excess of 1000° C., it is preferred that the composition be essentially free of alkali or other oxides that can be reduced to the elemental state through reaction with silicon (e.g. PbO, ZnO, CuO, $P_2O_5$, etc.).

In the more limited system $SiO_2$—$Al_2O_3$—BaO—$TiO_2$, a small area of meltable glass compositions which can be heat treated to glass-ceramics displaying all the features of this invention was also found. This can be defined in weight percent as follows: $SiO_2$ 31-41, $Al_2O_3$ 27-33, BaO 24-32, and $TiO_2$ 6-12.

In another more limited system $SiO_2$—$Al_2O_3$—SrO—$TiO_2$, a somewhat larger area of meltable glass compositions which can be heat treated to glass-ceramics displaying all the features of this invention was likewise found. This can be defined in weight percent as follows: $SiO_2$ 30-45, $Al_2O_3$ 25-37, SrO 18-28, and $TiO_2$ 6-12. The barium free, strontium based glass ceramics may be more useful in applications where a lower density material is desired or for applications where toxicity is an issue.

The methods of forming of glass-articles from the compositions listed above include pressing, rolling, casting, centrifugal spinning, and other techniques available to current glass-technology. The fluid nature of these glasses make them particularly adaptable to precision casting, where thick castings of over an inch with narrow flanges can be demonstrated. Formed glass articles are then annealed, generally at temperatures between 700° C. and 850° C.

After forming and annealing of a glass article, the article is heat treated in order to convert it to a glass-ceramic. Typically, the article is placed into a gas or electric furnace and heat treated in the range of 800° C. to 900° C. for a nucleation period that can range from a short as 10 minutes to as long as several hours so long as there is homogenous dispersion and development of the titanate nuclei. Next, the temperature is raised to a higher temperature typically in the range of 950-1450° C. for a crystallization period. This crystallization period should last between 4-6 hours or as long as necessary to achieve maximum crystallinity for the selected composition. Some siliceous residual glass remains and helps to lower the CTE of the glass-ceramic.

The major crystal phase is feldspar of the monoclinic celsian type, either barium or strontium end-members or solid solutions or mixtures of solid solutions between these end members. In addition to the major celsian-type phases, important accessory phases are present in these glass-ceramics. These include at least one titanate phase, normally aluminum titanate ($Al_2TiO_5$) or rutile ($TiO_2$), and a siliceous glassy phase. Mullite ($Al_6Si_2O_{13}$) may also be present as a secondary phase, in an amount typically less than 10% by volume, and variable depending on exact composition.

The crystals are fine-grained, typically between 0.5 and 20 um. The microstructure is uniform. When heat treated to 1400° C. or above, the surface of the glass-ceramic is typically grey to white, while the interior is generally grey. The whiter surface is presumed due to oxidation of small amounts of reduced titanium, $Ti^{3+}$, present in the glass-ceramic.

The glass-ceramic of the present invention may be formed into any number of articles. The glass-ceramic is especially adapted to articles requiring low CTE, good fracture toughness, good strength, oxidation resistance, and high temperature requirements. For example, fracture toughness of greater than 1.2 $K_{1c}$ MPa·$m^{1/2}$ is common. Fracture toughness may exceed 2, and even 2.5 $K_{1c}$ MPa·$m^{1/2}$. Modulus of rupture has been measured to be in excess of 89±5 M.O.R. (MPa). The inherent oxidation-resistance of glass-ceramic permits its use where silicon nitride would oxidize.

Potential uses include substrates for semiconductor crystallization. The high use temperature of up to 1450° C. is necessary to melt and subsequently recrystallize silicon to its largest grain size, where efficiency for photovoltaic or other semiconductor applications can approach that of single crystals. Moreover, the CTE match of silicon and celsian-type feldspar glass-ceramics allows formation and subsequent cooling of continuous films. This cannot be achieved with other refractory ceramic substrates like alumina, which are too high in CTE and yield tension cracks in an applied silicon film upon cooling.

Another potential use of the barium feldspar celsian ($BaAl_2Si_2O_8$) and the strontium feldspar glass ceramic material of the present invention include the use for high temperature engine components. The ability to withstand temperatures of 1450° C. is important for advanced engine components. The moderately low CTE of celsian-type glass-ceramics coupled with good flexural strength, toughness, and fluid precision casting capability allows these glass-ceramics to compete with expensive silicon nitride in these areas. Testing has indicated that the disclosed glass ceramics withstand temperatures in excess of 1400° C. and 1450° C. without substantial deformation or change of shape. The softening temperatures of these materials are in excess of 1450° C.

A further potential application for refractory, fine-grained and non-porous celsian-type glass-ceramics are use as precision molds for the casting of high temperature metals and alloys.

Still a further potential application for the barium feldspar celsian ($BaAl_2Si_2O_8$) and the strontium feldspar glass ceramic material of the present invention include the use for radomes, or missile nose cones, which require high temperature use, thermal shock resistance and an absence of alkali for good microwave transparency for guidance. Celsian glass-ceramics are more refractory by ~150° C. than currently used cordierite-based radomes.

The barium feldspar celsian ($BaAl_2Si_2O_8$) and the strontium feldspar analog of celsian ($SrAl_2Si_2O_8$) are described in the crystallographic literature as monoclinic and belonging to the space group I2/c. The primary phase feldspar of the glass ceramics of the present invention are likewise believed to be monoclinic.

EXAMPLES

The following Table 1 provides examples of representative compositions according to the invention. Compositional information is in weight percent and is, as batched, unless otherwise indicated.

The compositions were batched to yield 1 kilogram of glass using appropriate amounts of the following raw materials: BERKELEY Sand (SILICOSIL 75), low soda alumina, barium carbonate, strontium carbonate, and titanium dioxide. The batches were mixed for 15 minutes in a TURBULA mixer and then placed in a 650 mm platinum crucible. The crucibles were placed in an electric (GLOBAR) furnace at 1650° C. for 16 hours and the batch was melted to good quality molten glass. The melts were then poured into steel molds to yield glass patties about 4×8×¾ inches in size. Upon cooling, the patties were moved to an annealing furnace at 775° C. and held for several hours and then cooled. The resulting glasses were cut into slabs and heat treated according to the schedules given in Table 1. Heating rates prior to and between holds were roughly 300° C./hr. The crystal phases produced during these heat treatments were determined by x-ray diffraction. Properties were measured by standard ASTM techniques.

TABLE 1

| Component | 1 | 2 | 3 | 4 | 5 | 6 | 7 | 8 |
|---|---|---|---|---|---|---|---|---|
| $SiO_2$ | 36.7 | 37.4 | 36.1 | 32.5 | 37.3 | 38.2 | 35.5 | 39.3 |
| $Al_2O_3$ | 29.4 | 29.9 | 29.0 | 29.8 | 29.8 | 30.5 | 32.1 | 31.4 |
| BaO | 25.7 | 26.2 | 27.0 | 29.5 | 19.1 | 12.7 | 9.6 | 13.1 |
| SrO | 0.0 | 0.0 | 0.0 | 0.0 | 4.7 | 9.5 | 14.5 | 9.7 |
| $TiO_2$ | 8.2 | 6.5 | 8.2 | 8.2 | 9.1 | 9.1 | 8.3 | 6.5 |
| Heat Treatment (° C. - hrs) | 850° C. - 2, 1450° C. - 6 | 850° C. - 2, 1450° C. - 6 | 850° C. - 2, 1425° C. - 6 | 850° C. - 2, 1450° C. - 6 | 850° C. - 2, 1300° C. - 6 | 850° C. - 2, 1450° C. - 6 | 850° C. - 2, 1300° C. - 6 | 850° C. - 2, 1425° C. - 6 |
| Crystal Phases | Celsian, AT, mullite, rutile | Celsian mullite AT rutile, tr. hexacelsian | Celsian, AT mullite, tr. rutile | Celsian, AT | Celsian ss., AT | Celsian ss., AT | Celsian ss., AT mullite | Celsian ss., AT, mullite rutile |
| CTE (25-1000° C.) × $10^{-7}$ | 38.2 | | | | | 43.6 | 43.7 | |
| Fracture Toughness ($K_{1c}$) MPa·$m^{1/2}$ | | | | 1.7 ± 0.1 | | | | |
| M.O.R. (abraded) MPa | | | | 89 ± 5 | | | | |

| Component | 9 | 10 | 11 | 12 | 13 | 14 | 15 |
|---|---|---|---|---|---|---|---|
| $SiO_2$ | 40.0 | 37.2 | 34.1 | 36.9 | 31.8 | 33.6 | 33.3 |
| $Al_2O_3$ | 32.0 | 30.5 | 32.9 | 33.2 | 32.1 | 30.3 | 35.0 |

TABLE 1-continued

|  | | | | | | | |
|---|---|---|---|---|---|---|---|
| BaO | 0.0 | 0.0 | 0.0 | 0.0 | 0.0 | 0.0 | 0.0 |
| SrO | 18.9 | 24.1 | 23.9 | 21.7 | 26.1 | 26.1 | 23.5 |
| TiO$_2$ | 9.1 | 8.3 | 9.1 | 8.3 | 10.0 | 10.0 | 8.2 |
| Heat Treatment | 850° C. - 2, 1425° C. - 6 | 850° C. - 2, 1425° C. - 6 | 850° C. - 2, 1425° C. - 6 | 850° C. - 2, 1425° C. - 6 | 850° C. - 2, 1425° C. - 6 | 850° C. - 2, 1425° C. - 6 | 850° C. - 2, 1425° C. - 6 |
| Crystal Phases | Sr-feldspar (Sr-celsian) AT mullite rutile | Sr-feldspar (Sr-celsian) AT rutile | Sr-feldspar (Sr-celsian) AT tr. anatase | Sr-feldspar (Sr-celsian) AT mullite, tr. anatase | | | Sr-feldspar (Sr-celsian), At, mullite |
| CTE (25-1000° C.) × 10$^{-7}$ | | | | 43.2 | 36.9 | | |
| Fracture Toughness (K$_{1c}$) MPa·m$^{1/2}$ | | | | 2.7 ± 0.2 | 2.2 ± 0.1 | | |
| M.O.R. (abraded) MPa | | | | 132 ± 17 | | | |

CTE—coefficient of thermal expansion
ss—solid solutions
tr—trace
AT—Aluminum titanate
M.O.R.—Modulus of rupture
MPa—megapascals Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

The invention claimed is:

1. A glass-ceramic formed from a composition comprising, in weight percent:

| | |
|---|---|
| SiO$_2$ | 25-40%, |
| Al$_2$O$_3$ | 23-37%, |
| TiO$_2$ | 5-15%, |
| BaO | 0-35%, |
| SrO | 18-30%, and |
| Molar ratio SrO + BaO/Al$_2$O$_3$ | <1.2, | wherein the glass-ceramic includes strontium feldspar as a primary crystalline phase and wherein the composition is free of alkali metals and free of oxides that can be reduced to the elemental state through reaction with silicon.

2. The glass-ceramic of claim 1, wherein the glass-ceramic further includes celsian (BaAl$_2$Si$_2$O$_8$).

3. The glass-ceramic of claim 1, wherein the glass-ceramic has a CTE from 30-55×10$^{-7}$/° C. in the temperature range 25-1000° C.

4. The glass-ceramic of claim 1, wherein the glass ceramic has a softening temperature in excess of 1450° C.

5. The glass-ceramic of claim 1, wherein the composition further comprises additional components combining for less than 5 weight percent.

6. A photovoltaic device comprising a substrate made from the glass ceramic of claim 1.

7. The glass ceramic of claim 1, wherein the fracture toughness exceeds 1.2 K$_{1c}$ MPa·m$^{1/2}$.

8. The glass ceramic of claim 1 wherein the modulus of rupture exceeds 89±5 M.O.R.(MPa).

9. The glass ceramic of claim 1 wherein the composition comprises SrO+BaO in an amount between 20-30 weight percent.

10. The glass ceramic of claim 1 further comprising at least one secondary crystal phase selected from the group consisting of aluminum titanate, mullite, and rutile.

11. The glass ceramic of claim 1 wherein the glass ceramic has a use temperature in excess of 1250° C.

12. A glass ceramic article capable of use temperatures in excess of about 1250° C. comprising uniformly fine grained crystals of primarily one monoclinic feldspar, said crystals being formed through crystallization in situ from a glass body comprising, in weight percent: 25-40% SiO$_2$; Al$_2$O$_3$ 23-37%; 0-35% BaO; 18-30% SrO; molar ratio SrO+BaO/Al$_2$O$_3$<1.2, and at least one nucleating agent present in excess of the base glass composition selected from the group consisting of TiO$_2$, ZnS, ZrO$_2$, V$_2$O$_5$, MoO$_3$, CaF$_2$, WO$_3$, NiO, Au, Pt, Rh, and Ir; and wherein said glass ceramic article is free of alkali metals and free of oxides that can be reduced to the elemental state through reaction with silicon.

13. The glass ceramic article of claim 12 further demonstrating use temperatures in excess of 1300° C.

14. The glass ceramic article of claim 12 further demonstrating use temperatures in excess of 1350° C.

15. The glass ceramic article of claim 3 taking the shape of a radome.

16. A glass-ceramic formed from a composition comprising, in weight percent:

| | |
|---|---|
| SiO$_2$ | 25-40%, |
| Al$_2$O$_3$ | 25-37%, |
| TiO$_2$ | 6-12%, and |
| SrO | 18-28%. |

17. The glass ceramic of claim 16 whereby the molar ratio SrO/Al$_2$O$_3$ is less than 1.2.

18. A glass-ceramic formed from a composition comprising, in weight percent:

| | |
|---|---|
| $SiO_2$ | 25-40%, |
| $Al_2O_3$ | 23-37%, |
| $TiO_2$ | 5-15%, |
| BaO | 0-35%, |
| SrO | 0-30%, |
| Molar ratio SrO + BaO/$Al_2O_3$ | <1.2, and |
| SrO + BaO | 15-35% | wherein (i) the glass-ceramic includes strontium or barium feldspar or a solid solution between strontium feldspar and barium feldspar as a primary crystalline phase, (ii) the composition is free of alkali metals, (iii) the composition is free of all of PbO, ZnO, CuO, and $P_2O_5$, and (iv) the glass-ceramic will not deform or change shape at temperatures in excess of 1350° C.

19. The glass-ceramic of claim 18, which has a softening temperature exceeding 1400° C.

20. The glass-ceramic of claim 18, which has a softening temperature exceeding 1450° C.

21. The glass-ceramic of claim 18, wherein SrO+BaO is in an amount between 20 and 30 weight percent.

* * * * *